(12) United States Patent
Hori

(10) Patent No.: US 6,348,993 B1
(45) Date of Patent: Feb. 19, 2002

(54) METHOD OF MANUFACTURING A TRANSLUCENT SCREEN AND REAR PROJECTION DISPLAY APPARATUS

(75) Inventor: Hidehiko Hori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,160

(22) Filed: Jun. 21, 2000

Related U.S. Application Data

(62) Division of application No. 09/270,048, filed on Mar. 16, 1999, now abandoned.

(30) Foreign Application Priority Data

Mar. 23, 1998 (JP) ............................................. 10-073802

(51) Int. Cl.⁷ .......................... G03B 21/56; B29D 11/00
(52) U.S. Cl. ........................ 359/443; 359/460; 164/1.7; 164/2.6
(58) Field of Search ................................. 359/443, 457, 359/460, 449, 507, 512; 264/1.7, 2.6; 156/99

(56) References Cited

U.S. PATENT DOCUMENTS

| | | | |
|---|---|---|---|
| 3,811,750 A | 5/1974 | Coulthard | 350/117 |
| 4,083,626 A | 4/1978 | Miyahara et al. | 350/117 |
| 4,478,902 A * | 10/1984 | Tsuzuku et al. | 428/174 |
| 4,921,330 A | 5/1990 | Takahashi et al. | 350/128 |
| 4,961,642 A | 10/1990 | Ogino | 353/38 |
| 5,011,277 A | 4/1991 | Ogino et al. | 353/94 |
| 5,200,854 A | 4/1993 | Ogino et al. | 359/451 |
| 5,337,179 A | 8/1994 | Hodges | 359/443 |
| 5,604,632 A | 2/1997 | Sawai | 359/443 |
| 5,699,131 A | 12/1997 | Aoki et al. | 348/832 |
| 5,708,528 A | 1/1998 | Furuya | 359/457 |
| 5,745,288 A | 4/1998 | Miyata et al. | 359/457 |
| 6,088,158 A * | 7/2000 | Kimura | 359/443 |

FOREIGN PATENT DOCUMENTS

| JP | 63A212926 | 9/1988 |
|---|---|---|
| JP | 4U129150 | 11/1992 |

* cited by examiner

*Primary Examiner*—Christopher E. Mahoney

(57) ABSTRACT

A method of manufacturing a translucent screen and a rear projection display apparatus, onto which an image light emitted from an image source is projected, that includes first and second screen members that expand and contract with variations in ambient temperature and humidity. The second screen member has a relatively lower rigidity than the first screen member. The second screen member is secured on the first screen member so that the second screen member is held under tension by the first screen member at normal ambient temperature and humidity.

30 Claims, 13 Drawing Sheets

HIGH TEMPERATURE AND/OR HIGH HUMIDITY

NORMAL AMBIENT TEMPERATURE AND HUMIDITY

SLIGHTLY HIGH TEMPERATURE AND/OR SLIGHTLY HIGH HUMIDITY

LOW TEMPERATURE AND/OR LOW HUMIDITY

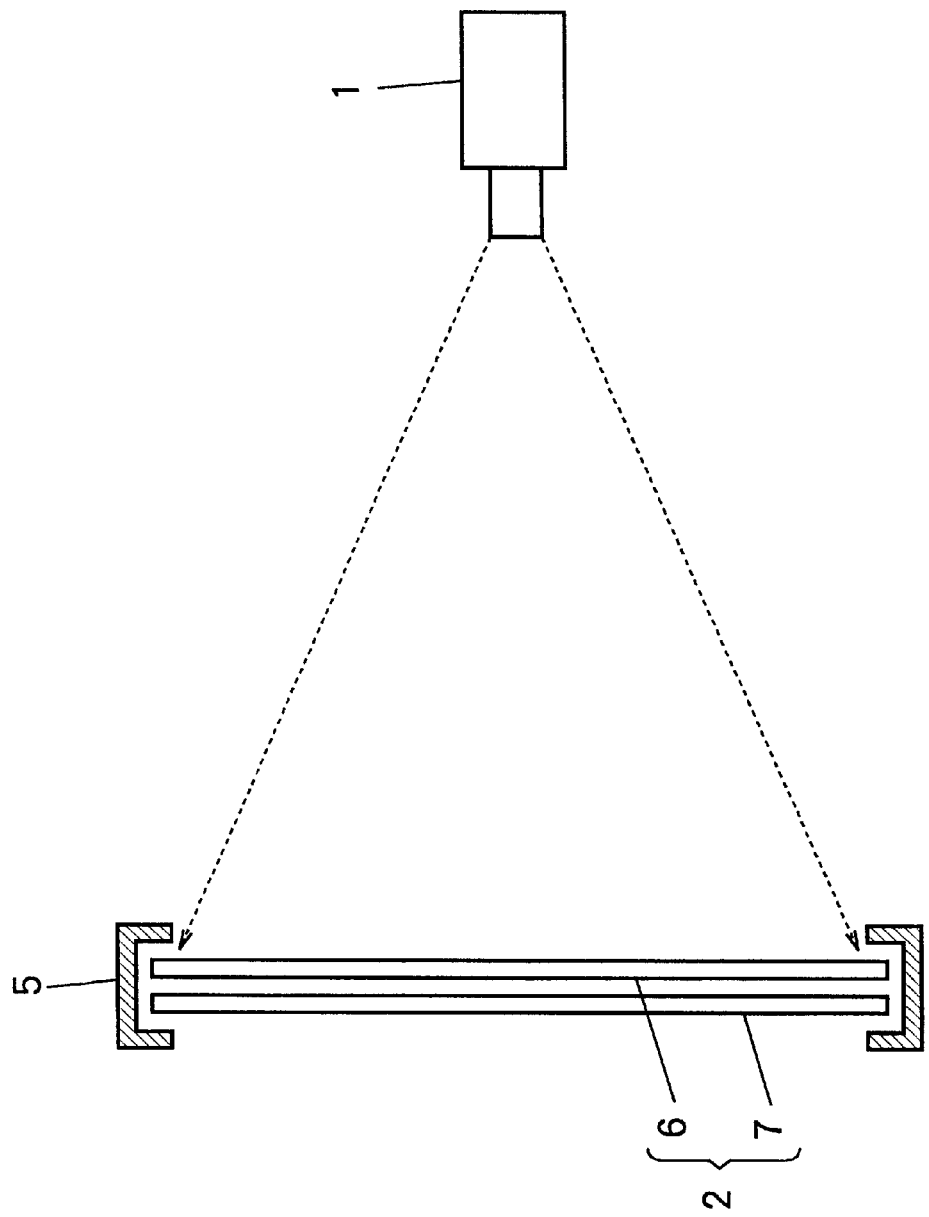

SLIGHTLY HIGH TEMPERATURE AND/OR SLIGHTLY HIGH HUMIDITY

LOW TEMPERATURE AND/OR LOW HUMIDITY

NORMAL AMBIENT TEMPERATURE AND HUMIDITY

HIGH TEMPERATURE AND/OR HIGH HUMIDITY

HIGH TEMPERATURE AND/OR HIGH HUMIDITY

SLIGHTLY LOW TEMPERATURE AND/OR SLIGHTLY LOW HUMIDITY

NORMAL AMBIENT TEMPERATURE AND HUMIDITY

LOW TEMPERATURE AND/OR LOW HUMIDITY

LOW TEMPERATURE AND/OR LOW HUMIDITY

HIGH TEMPERATURE AND/OR HIGH HUMIDITY

NORMAL AMBIENT TEMPERATURE AND HUMIDITY

SLIGHTLY HIGH TEMPERATURE AND/OR SLIGHTLY HIGH HUMIDITY

LOW TEMPERATURE AND/OR LOW HUMIDITY

NORMAL AMBIENT TEMPERATURE AND HUMIDITY

HIGH TEMPERATURE AND/OR HIGH HUMIDITY

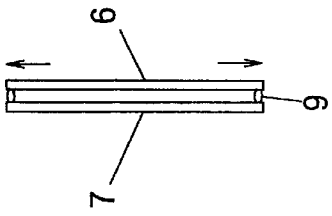
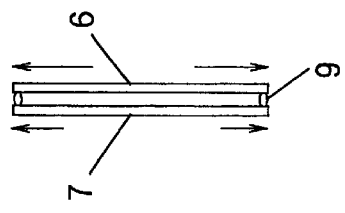
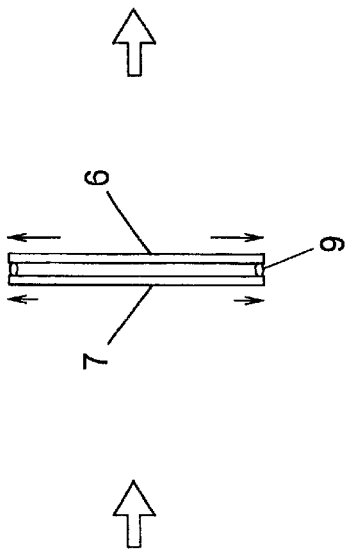
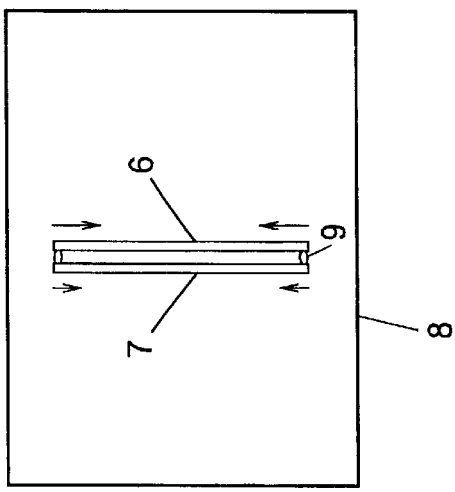

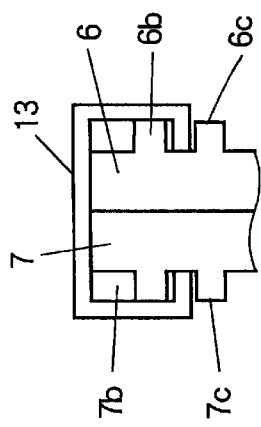
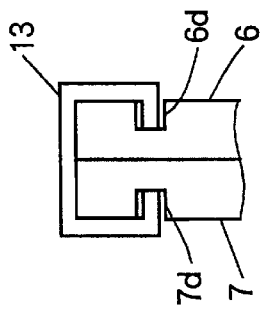
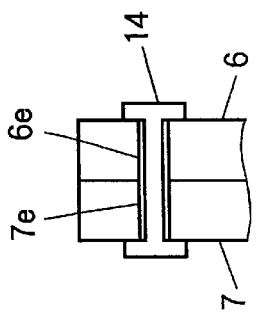
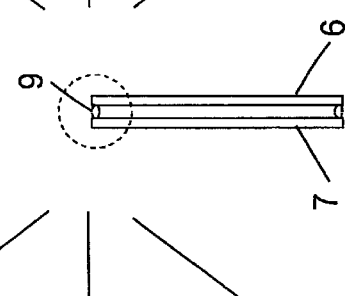
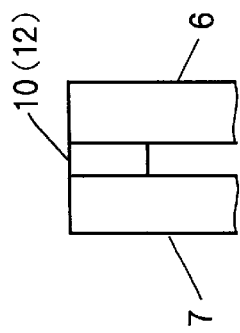
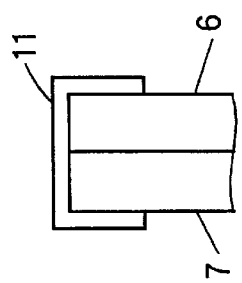
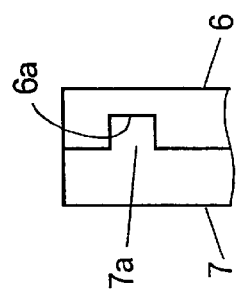

LOW TEMPERATURE AND/OR LOW HUMIDITY

NORMAL AMBIENT TEMPERATURE AND HUMIDITY

HIGH TEMPERATURE AND/OR HIGH HUMIDITY

NORMAL AMBIENT TEMPERATURE AND HUMIDITY

HIGH TEMPERATURE AND/OR HIGH HUMIDITY

NORMAL AMBIENT TEMPERATURE AND HUMIDITY

LOW TEMPERATURE AND/OR LOW HUMIDITY

NORMAL AMBIENT TEMPERATURE AND HUMIDITY

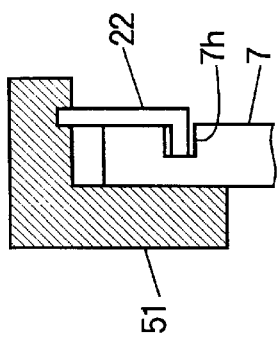
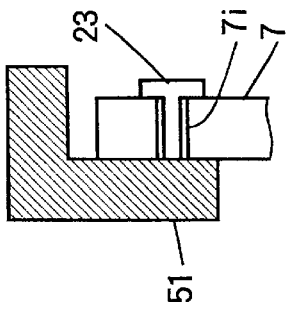
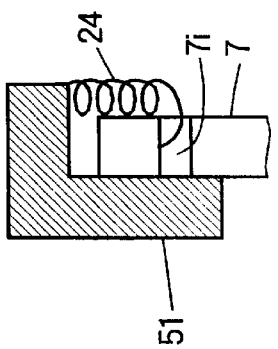
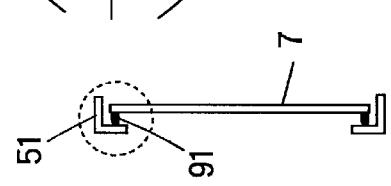
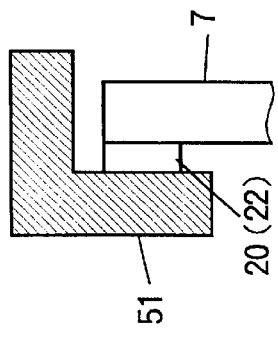
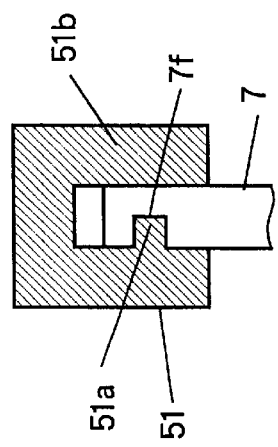
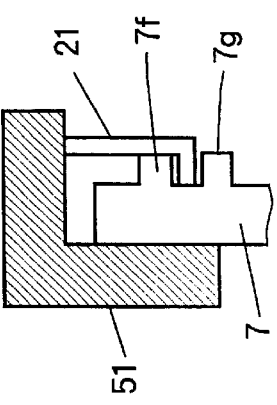

LOW TEMPERATURE AND/OR LOW HUMIDITY

NORMAL AMBIENT TEMPERATURE AND HUMIDITY

HIGH TEMPERATURE AND/OR HIGH HUMIDITY

METHOD OF MANUFACTURING A TRANSLUCENT SCREEN AND REAR PROJECTION DISPLAY APPARATUS

This application is a divisional of co-pending Application No. 09/270,048, filed on Mar. 16, 1999 now abandoned, the entire contents of which are hereby incorporated by reference.

BACKGROUND OF THE INVENTION

The present invention relates to a translucent screen onto which an image light emitted from an image source is projected, and a rear projection display apparatus including the translucent screen.

FIG. 14 is a vertical cross-sectional view schematically showing main components of a rear projection display apparatus incorporating a conventional translucent screen, and FIG. 15 is an enlarged horizontal cross-sectional view taken along a line $S_{15}$—$S_{15}$ of FIG. 14. In these figures, a reference numeral 1 denotes an image source such as a video projector, and a reference numeral 2 denotes a translucent screen which transmits the image light emitted from the image source 1 and brings the image light into focus to form an image. Further, a reference numeral 3 denotes a Fresnel lens sheet, and a reference numeral 4 denotes a lenticular lens sheet. The Fresnel lens sheet 3 and the lenticular lens sheet 4 compose the translucent screen 2. A reference numeral 5 denotes a frame member that integrally holds the translucent screen 2.

In the rear projection display apparatus having the conventional translucent screen 2, when the image light is emitted from the image source 1, the light beams are diverged and projected onto the translucent screen 2. When the light beams reach the Fresnel lens sheet 3 as diverging light, the light beams are refracted to substantially parallel beams, as shown in FIG. 15, then impinge on the lenticular lens sheet 4, and are brought into focus to form an image. The light beams from the lenticular lens sheet 4 suitably diverge in the horizontal and vertical directions and are perceived as an image by a viewer facing the screen 2.

The conventional translucent screen 2 is a combination of the Fresnel lens sheet 3 and the lenticular lens sheet 4, and is securely held by the frame member 5 such as a frame member secured on the cabinet or a part of the cabinet of the rear projection display apparatus.

Both the Fresnel lens sheet 3 and the lenticular lens sheet 4 are usually made of an acrylic resin, polycarbonate resin, or the like, which has a high light transmission, appropriate rigidity, and capability of volume production.

In the rear projection display apparatus having the conventional translucent screen 2, which is configured as described above, if both or either of the Fresnel lens sheet 3 or the lenticular lens sheet 4 forming the screen 2 is thin, the two sheets 3 and 4 are not properly cemented, causing a floating (hereafter referred to as a separation) of a part or entirety of the screen 2 because of the reasons described below.

The separation in the screen 2 maybe found, when the sheet 3 or 4 is warped in the sheet forming process prior to screen assembly and the warp does not disappear after the screen assembly. Possible causes of the separation are variations or the like in the sheet forming conditions which cause an internal stress or distortion of the sheet 3 or 4 in the sheet forming process, resulting in a warp of the sheet 3 or 4 at the end of the sheet forming process. Other possible causes of the warp of the separation are variations in the environment such as ambient temperature and humidity from after the sheet forming process to the screen assembly. The separation may also occur after the screen is assembled. This separation is caused by variations or the like in the environment in which the projection display apparatus is placed after the translucent screen 2 is assembled, more specifically, a difference in expansion coefficient between the two sheets 3 and 4, which causes the sheets 3 and 4 to expand or contract by different amounts. These phenomena are clearly found especially if the sheets 3 and 4 are thin and have a low rigidity.

The translucent screen 2 is designed so that an optimum image is projected when the screen 2 is placed in a certain position referred to the image source 1. The translucent screen 2 formed by two or more sheets is designed so that an optimum image is projected when the sheets 3 and 4 are tightly joined one another or when the sheets 3 and 4 are placed in certain positions referred to one another. If a separation occurs, the fundamental functions of the screen 2 are adversely affected, causing the projected image to have a deteriorated resolution or partly colored. Some causes of the problems lie in the initial performance of the translucent screen 2 while others in variations with time of the performance of the translucent screen 2 after the screen 2 is assembled, as described above.

The conventional solutions to the problems have been the two methods described below.

A first method is to form a thick Fresnel lens sheet 3 and/or a lenticular lens sheet 4. A second method is to dispose a flat translucent plate such as an acrylic plate or a glass plate on the side of the viewer of the lenticular lens sheet 4, as described in Japanese Utility Model Kokai Publication No. 04-129150 published on Nov. 25, 1992 in order to provide an appropriate rigidity to the whole translucent screen 2.

The first method of forming the thick Fresnel lens sheet 3 and/or the lenticular lens sheet 4, however, lowers the degree of flexibility in lens design of the Fresnel lens sheet 3 and/or the lenticular lens sheet 4. Accordingly, the translucent screen 2 cannot provide desired performance, or the effect of stray light generated in the translucent screen 2 may increase to greatly degrade the quality of the projected image.

First, the relationship between the thickness of the screen 2 and the effect of the stray light on the image will next be described.

FIG. 16 and FIG. 17 illustrate differences in the effect of stray light on the image. Both figures are partially enlarged vertical cross-sectional view of the translucent screen 2 indicated in FIG. 14. FIG. 16 shows a screen in which the Fresnel lens sheet 3 is thicker than the lenticular lens sheet 4. FIG. 17 shows a screen in which the Fresnel lens sheet 3 is relatively thin. In the figures, solid-line arrows indicate a part of the trace of the image light, and a broken-line arrow indicates a part of the trace of the stray light generated in the interface between the Fresnel lens sheet 3 and the air on the side of the light outgoing surface. Just an example of stray light is shown in the figure. Many other types of stray light can be generated in the translucent screen 2.

The stray light is reflected again in the interface between the Fresnel lens sheet 3 and the air on the side of the light incoming surface, passes the light outgoing surface of the Fresnel lens sheet 3 and the lenticular lens sheet 4, and reaches a viewer. If the Fresnel lens sheet 3 is thick as shown in FIG. 16, a path of the stray light is very far from a path of the original image light, significantly degrading the resolution and contrast of the image. If Fresnel lens sheet 3 is thin, a path of the stray is near to a path of the original image light, as shown in FIG. 17. Accordingly, as the thickness of the Fresnel lens sheet 3 decreases, the degradation of image light caused by the stray light is reduced.

In the second method of giving an appropriate rigidity to the whole translucent screen 2, a flat translucent plate or the like is disposed on the side of the viewer of the lenticular lens sheet 4. This method, however, poses the attenuation of the image light passing the flat translucent plate. In addition, as described with reference to FIG. 16, the light reflected in the interface between the flat translucent plate and the air causes stray light to be generated inside the flat translucent plate, significantly degrading the image light.

Either of these two approaches to get rid of the separation in the rear projection display apparatus having the conventional translucent screen cannot securely prevent image degradation and other problems from occurring.

SUMMARY OF THE INVENTION

It is an object of the present invention to provide a translucent screen that prevents separations, minimizing degradation in image projected thereon, and a rear projection display apparatus including the translucent screen.

According to an aspect of the present invention, a translucent screen onto which an image light emitted from an image source is projected, comprises: a first screen member that expands and contracts with variations in ambient temperature and humidity; and a second screen member that expands and contracts with variations in ambient temperature and humidity, the second screen member having a relatively lower rigidity than the first screen member; wherein the second screen member is secured on the first screen member so that the second screen member is held under tension by the first screen member at the normal ambient temperature and humidity.

The second screen member may be expanded at a high ambient temperature which is higher than the normal ambient temperature and/or a high ambient humidity which is higher than the normal ambient humidity, immediately before the second screen member is secured on the first screen member.

Further, the first screen member may is contracted at a low ambient temperature which is lower than the normal ambient temperature and/or a low ambient humidity which is lower than the normal ambient humidity, immediately before the second screen member is secured on the first screen member.

Furthermore, the second screen member may be expanded at a high ambient temperature which is higher than the normal ambient temperature and/or a high ambient humidity which is higher than the normal ambient humidity, and the first screen member may be contracted at a low ambient temperature which is lower than the normal ambient temperature and/or a low ambient humidity which is lower than the normal ambient humidity, immediately before the second screen member is secured on the first screen member.

Moreover, the first screen member has a first expansion coefficient, the second screen member has a second expansion coefficient which is larger than the first expansion coefficient, and the first screen member and the second screen member are placed at a high ambient temperature which is higher than the normal ambient temperature and/or a high ambient humidity which is higher than the normal ambient humidity when the second screen member is secured on the first screen member.

Further, the first screen member has a first expansion coefficient, the second screen member has a second expansion coefficient which is smaller than the first expansion coefficient, and the first screen member and the second screen member are placed at a low ambient temperature which is lower than the normal ambient temperature and/or a low ambient humidity which is lower than the normal ambient humidity when the second screen member is secured on the first screen member.

According to another aspect of the present invention, a rear projection display apparatus comprises a translucent screen onto which an image light emitted from an image source is projected, the translucent screen expanding and contracting with variations in ambient temperature and humidity; and a frame member for holding the translucent screen, the frame member having a relatively higher rigidity than the translucent screen; wherein the translucent screen is secured on the frame member so that the translucent screen is held under tension by the frame member at the normal ambient temperature and humidity.

Further, the translucent screen may be expanded at a high ambient temperature which is higher than the normal ambient temperature and/or a high ambient humidity which is higher than the normal ambient humidity, immediately before the translucent screen is secured on the frame member.

Furthermore, the frame member may be contracted at a low ambient temperature which is lower than the normal ambient temperature, immediately before the translucent screen is secured on the frame member.

Moreover, the translucent screen may be expanded at a high ambient temperature which is higher than the normal ambient temperature and/or a high ambient humidity which is higher than the normal ambient humidity, and the frame member may be contracted at a low ambient temperature which is lower than the normal ambient temperature, immediately before the translucent screen is secured on the frame member.

Additionally, the translucent screen has a first expansion coefficient, the frame member has a second expansion coefficient which is smaller than the first expansion coefficient, and the translucent screen and the frame member are placed at a high ambient temperature which is higher than the normal ambient temperature and/or a high ambient humidity which is higher than the normal ambient humidity when the translucent screen is secured on the frame member.

Further, the translucent screen has a first expansion coefficient, the frame member has a second expansion coefficient which is larger than the first expansion coefficient, and the translucent screen and the frame member are placed at a low ambient temperature which is lower than the normal ambient temperature and/or a low ambient humidity which is lower than the normal ambient humidity when the translucent screen is secured on the frame member.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a vertical cross-sectional view schematically showing main components of a rear projection display apparatus including a translucent screen according to a first embodiment of the present invention;

FIGS. 6A to 6D are conceptual diagrams showing how the translucent screen is assembled in a fifth embodiment of the present invention;

FIGS. 7A to 7G are diagrams schematically showing a securing means for securing a couple of screen members of the translucent screen according to a sixth embodiment of the present invention;

FIGS. 12A to 12G are diagrams schematically showing a frame members for holding the translucent screen according to a tenth embodiment of the present invention;

DETAILED DESCRIPTION OF THE INVENTION

Figure 2C:
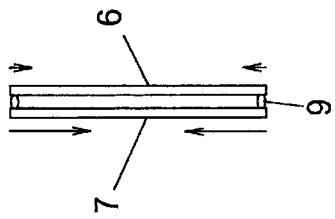
FIGS. 2A to 2D are conceptual diagrams showing how the translucent screen is assembled in the first embodiment.

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

FIG. 1 is a vertical cross-sectional view schematically showing main components of a rear projection display apparatus incorporating a translucent screen according to a first embodiment of the present invention.

As shown in FIG. 1, the rear projection display apparatus includes an image source such as a projector and a translucent screen 2 onto which an image light emitted from the image source 1 is projected. The translucent screen 2 includes a Fresnel lens sheet 6 as a first screen member that expands and contracts with variations in ambient temperature and humidity, and a lenticular lens sheet 7 as a second screen member that expands and contracts with variations in ambient temperature and humidity. In this embodiment, the second screen member 7 has a relatively lower rigidity than the first screen member 6. The rear projection display apparatus also includes a frame member 5 as a holding means that integrally holds or clamps the translucent screen 2. The frame member 5 is a frame-shaped member fixed to a cabinet (not shown) of the rear projection display apparatus, for instance.

For the sake of convenience, the first screen member 6 with a relatively high rigidity and the second screen member 7 with a relatively low rigidity are disposed in that order from the side of the image source 1. The order of the disposition may be reversed. Further, the first screen member 6 and the second screen member 7 are usually made of acrylic resin, polycarbonate resin, or the like, which provides an appropriate light transmission performance, appropriate rigidity, and capability of volume production. Some other materials that expand and contract with variations in ambient temperature and/or humidity may also be used as the screens 6 and 7.

Figure 2D:
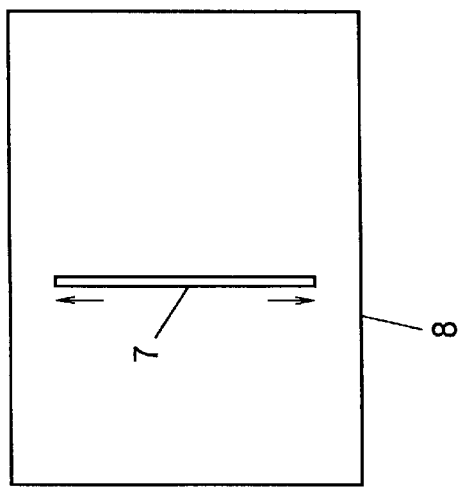
Figure 2B:
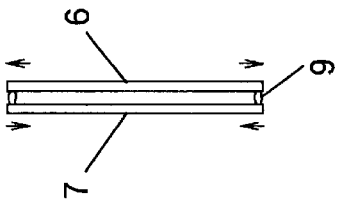
Figure 2A:
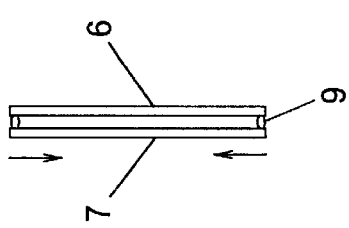

FIGS. 2A to 2D are conceptual diagrams showing how the translucent screen of the first embodiment is assembled. The arrows in FIGS. 2A to 2D represent the magnitude and direction of the force associated with the expansion and contraction of the first screen member 6 and the second screen member 7. In FIG. 2A, a reference numeral 8 denotes a temperature/humidity controlled vessel which can hold the inside ambient temperature and/or humidity constant. The second screen member 7 is initially placed in the temperature/humidity controlled vessel 8. In FIGS. 2B, 2C and 2D, a reference numeral 9 denotes a securing component for securing the first screen member 6 and the second screen member 7, maintaining certain positional relationship therebetweeen.

The first screen member 6 and the second screen member 7 used in the rear projection display apparatus will next be described with reference to FIGS. 2A to 2D. As shown in FIG. 2A, the second screen member 7 is exposed in a high ambient temperature and/or high ambient humidity, which is higher than the normal ambient temperature and/or humidity, provided by the temperature/humidity controlled vessel 8 for a predetermined period of time in advance. Since general plastic materials such as acrylic expand with increase in ambient temperature and humidity, the second screen member 7 expands with increase in ambient temperature and humidity in the temperature/humidity controlled vessel 8. On the other hand, the first screen member 6 is placed at normal (or room) ambient temperature and humidity. The expanded second screen member 7 is taken out of the temperature/humidity controlled vessel 8 and immediately secured on the first screen member 6 by the securing component 9 at the normal ambient temperature and humidity. Then, the temperature of the second screen member 7 gradually decreases. When the temperature of the second screen member 7 decreases toward the normal ambient temperature, contracting forces appear in the second screen member 7, as indicated by the arrows in FIG. 2B.

In the translucent screen 2, the expanded second screen member 7, which has a relatively low rigidity, contracts with the subsequent lapse of time as it returns to the stationary state at the normal ambient temperature and humidity. The first screen member 6 with a high rigidity, however, was not subjected to any variation in ambient temperature and humidity, and does not expand nor contract. The first screen member 6 of the translucent screen 2 always exerts a relative tension on the second screen member 7 in such a direction that the second screen member 7 is stretched out. Accordingly, the second screen member 7 with a relatively low rigidity will not be wrinkled nor cause partial or entire separation in the translucent screen 2. Therefore, the rear projection display apparatus with little image degradation can be provided.

Another advantage of the rear projection display apparatus of the first embodiment is that the translucent screen 2 can minimize image degradation not only in the early period after the second screen member 7 returns to the normal ambient temperature and humidity but also with subsequent environmental variations.

FIG. 2C shows forces appearing in the first screen member 6 and the second screen member 7 with subsequent increase in ambient temperature and/or humidity of the translucent screen 2. With this environmental change, the second screen member 7 having a relatively low rigidity is still subjected to a contracting force while the first screen member 6 having a relatively high rigidity is subjected to an expanding force. Therefore, even if the ambient temperature and/or humidity slightly rises from the normal ambient temperature and humidity after assembly, the second screen member 7 with a relatively low rigidity will not be wrinkled nor cause separation.

FIG. 2D shows forces appearing in the first screen member 6 and the second screen member 7 with subsequent decrease in ambient temperature and/or humidity of the translucent screen 2. With this environmental change, both the second screen member 7 having a relatively low rigidity and the first screen member 6 having a relatively high rigidity are subjected to contracting forces. If a comparison is made between the two forces, the contracting force applied to the second screen member 7 is larger. Therefore, even if the ambient temperature and/or humidity falls below the normal ambient temperature and humidity after assembly, the second screen member 7 with a relatively low rigidity will not be wrinkled nor cause separation.

The ambient temperature and/or humidity settings in the temperature/humidity controlled vessel 8 may be determined according to the amount of enlargement of the second screen member 7. For instance, it is known that if acrylic has a linear thermal expansion coefficient of $7 \times 10^{-5}$ (/° C.) and a linear hygroscopic expansion coefficient of $4 \times 10^{-5}$ (%/%R.H) due to moisture absorption, the second screen member 7 is elongated by about 0.2% in the temperature/humidity controlled vessel 8 held to an ambient temperature 30° C. higher than the normal ambient temperature. That is, if the second screen member 7 has a length (width) of 2 m, the length (width) increases by 4 mm.

In FIGS. 2B, 2C and 2D, the expanded second screen member 7 is secured on the first screen member 6 with a relatively high rigidity. A similar effect can be obtained by securely holding the expanded second screen member 7 by the frame member 5 with a relatively higher rigidity than the second screen member 7.

In the above description of the first embodiment, the rear projection display apparatus has the translucent screen 2 comprising two screen members 6 and 7. However, the same effect can be obtained by using a translucent screen comprising three or more screen members.

Second Embodiment

In the above-described first embodiment, the second screen member 7 with a relatively low rigidity is expanded in advance in the high ambient temperature and/or high ambient humidity provided by the temperature/humidity controlled vessel 8. On the contrary, in the rear projection display apparatus of the second embodiment, the first screen member 6 with a relatively high rigidity is exposed beforehand in a low ambient temperature and/or low ambient humidity, which is lower than the normal ambient temperature and/or humidity, provided by the temperature/humidity controlled vessel 8, and the contracted first screen member 6 is secured on the second screen member 7 so that the same effect as obtained by the first embodiment can be obtained.

FIGS. 3A to 3D are conceptual diagrams showing how the translucent screen of the second embodiment is assembled. Contrary to the above-described first embodiment, the first screen member 6 with a relatively high rigidity is placed at a low ambient temperature and/or low ambient humidity provided by the temperature/humidity controlled vessel 8 for a certain period of time so that it contracts. General plastic materials such as acrylic contract with decrease in ambient temperature and/or humidity. On the other hand, the second screen member 7 is placed at the normal ambient temperature and/or humidity. The contracted first screen member 6 is taken out of the temperature/humidity controlled vessel 8 and immediately secured on the second screen member 7 by the securing component 9 at the normal ambient temperature and humidity. Then, the temperature of the first screen member 6 gradually increases. When the temperature of the first screen member 6 increases toward the normal ambient temperature, expanding forces appear in the first screen member 6, as indicated by the arrows in FIG. 3B.

In the translucent screen 2, the contracted first screen member 6, which has a relatively high rigidity, expands with the subsequent lapse of time as it returns to the stationary state at the normal ambient temperature and humidity. The second screen member 7 with a low rigidity, however, was not subjected to any variation in ambient temperature and humidity, and does not expand nor contract. The first screen member 6 of the translucent screen 2 always exerts a relative tension on the second screen member 7 in such a direction that the second screen member 7 is stretched out. Accordingly, the second screen member 7 with a relatively low rigidity will not be wrinkled nor cause partial or entire separation in the translucent screen 2. Therefore, the rear projection display apparatus with little image degradation can be provided.

Like the above-described first embodiment, the rear projection display apparatus of the second embodiment has an advantage that the translucent screen 2 can minimize image degradation not only in the early period after the second screen member 7 returns to the normal ambient temperature and humidity but also with subsequent environmental variations.

Figure 3C:
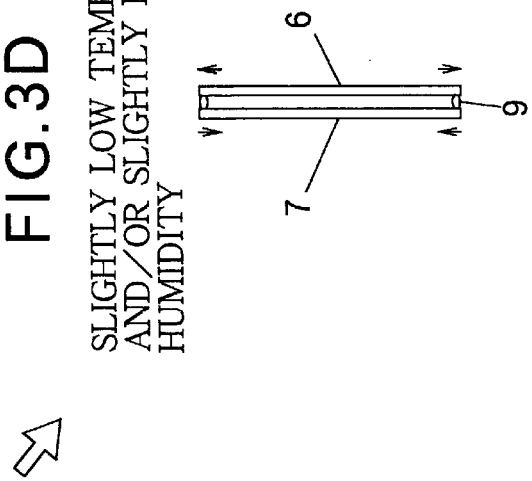
FIGS. 3A to 3D are conceptual diagrams showing how the translucent screen is assembled in a second embodiment of the present invention.

FIG. 3C shows forces appearing in the first screen member 6 and the second screen member 7 with subsequent increase in ambient temperature and/or humidity of the translucent screen 2. With this environmental change, both the second screen member 7 having a relatively low rigidity and the first screen member 6 having a relatively high rigidity are subjected to expanding forces. The expanding force appearing in the first screen member 6, which contracted beforehand, is larger than the expanding force appearing in the second screen member 7. Therefore, even if the ambient temperature and/or humidity slightly rises from the normal ambient temperature and humidity after assembly, the second screen member 7 with a relatively low rigidity will not be wrinkled nor cause separation.

Figure 3D:
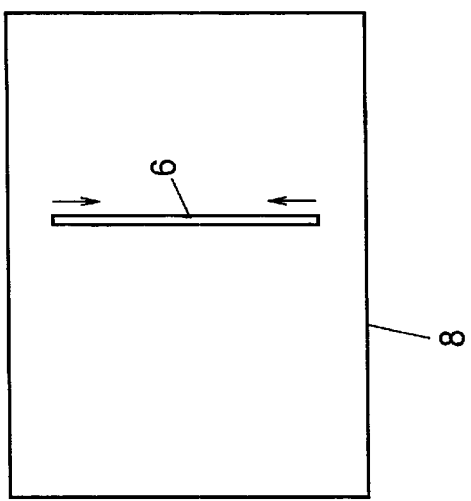

FIG. 3D shows forces appearing in the first screen member 6 and the second screen member 7 with subsequent decrease in ambient temperature and/or humidity of the translucent screen 2. With this environmental change, the second screen member 7 having a relatively low rigidity is subjected to contracting force while the first screen member 6 having a relatively high rigidity is still subjected to expanding force. Therefore, even if the ambient temperature and/or humidity slightly falls below the normal ambient temperature and humidity after assembly, the second screen member 7 with a relatively low rigidity will not be wrinkled nor cause separation.

In the above description of the second embodiment, the rear projection display apparatus has the translucent screen 2 comprising two screen members 6 and 7. However, the same effect can be obtained by using a translucent screen comprising three or more screen members.

Third Embodiment

In the above-described first embodiment, just the second screen member 7 with a relatively low rigidity is exposed in a high ambient temperature and/or high ambient humidity, and the expanded second screen member 7 is secured on the first screen member 6 with a relatively high rigidity at the normal ambient temperature and humidity.

Further, in the above-described second embodiment, just the first screen member 6 with a relatively high rigidity is exposed in a low ambient temperature and/or low ambient humidity, and the contracted first screen member 6 is secured on the second screen member 7 with a relatively low rigidity at the normal ambient temperature and humidity.

Figure 4A:
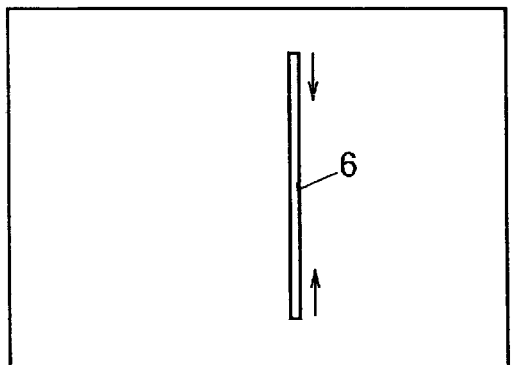
FIGS. 4A to 4C are conceptual diagrams showing how the translucent screen is assembled in a third embodiment of the present invention.
Figure 4B:
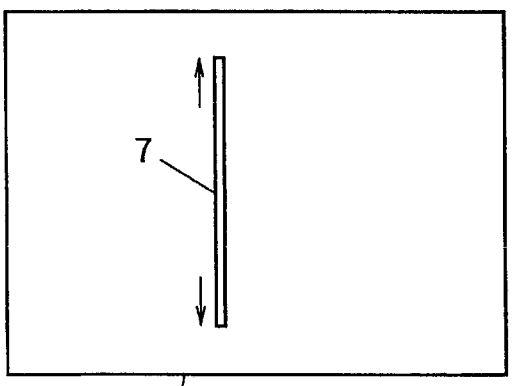
Figure 4C:
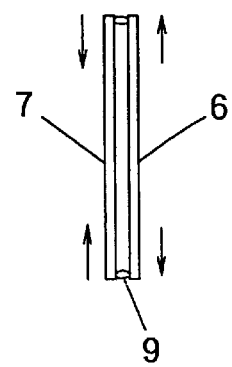

The translucent screen 2 of the rear projection display apparatus of the third embodiment has the same effect. FIGS. 4A to 4C are conceptual diagrams showing how the translucent screen of the third embodiment is assembled. The first screen member 6 with a relatively high rigidity is exposed beforehand in a low ambient temperature and/or low ambient humidity atmosphere provided by the temperature/humidity controlled vessel 8a, as shown in FIG. 4A, and the second screen member 7 with a relatively low rigidity is exposed in a high ambient temperature and/or high ambient humidity atmosphere provided by the temperature/humidity controlled vessel 8b, as shown in FIG. 4B. Then, the two screen members 6 and 7 are secured on each other at the normal ambient temperature and humidity, as shown in FIG. 4C. Accordingly, the second screen member 7 with a relatively low rigidity will not be wrinkled nor cause separation.

In the above description of the third embodiment, the rear projection display apparatus has the translucent screen 2 comprising two screen members 6 and 7. However, the same effect can be obtained by using a translucent screen comprising three or more screen members.

Fourth Embodiment

The rear projection display apparatus of the fourth embodiment has the same effect as that of the first embodiment. The second screen member 7 with a relatively lower rigidity than the first screen member 6 has an expansion coefficient $\beta$, which is larger than an expansion coefficient $\alpha$ ($\beta>\alpha$) of the first screen member 6 with a relatively high rigidity, and the screen members 6 and 7 are secured on each other by the securing means 9 at a high ambient temperature and/or high ambient humidity provided by the temperature/humidity controlled vessel 8.

FIGS. 5A to 5D are conceptual diagrams showing how the translucent screen of the fourth embodiment is assembled. The arrows in the figures represent the magnitude and direction of the force associated with the expansion and contraction of the screen members.

Figure 5C:
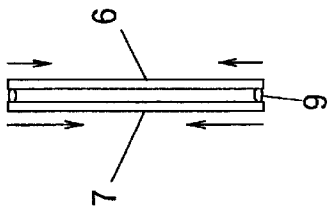
FIGS. 5A to 5D are conceptual diagrams showing how the translucent screen is assembled in a fourth embodiment of the present invention.
Figure 5D:
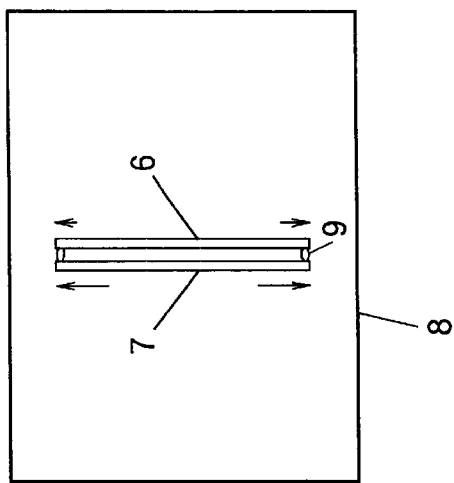
Figure 5B:
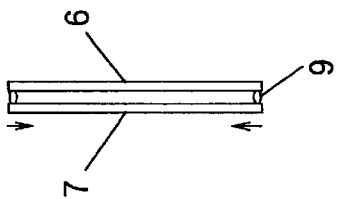
Figure 5A:
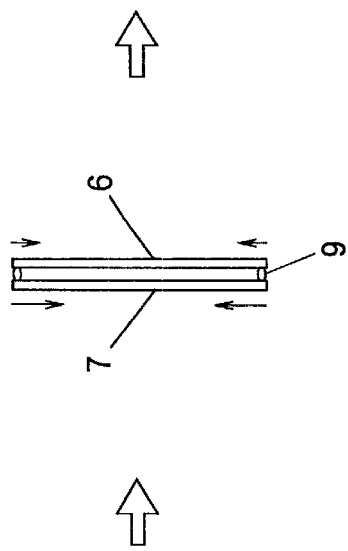

As shown in FIG. 5A, the second screen member 7 with a relatively low rigidity and the first screen member 6 with a relatively high rigidity are exposed in a high ambient temperature and/or high ambient humidity atmosphere provided by the temperature/humidity controlled vessel 8 for a certain period of time. Both the first screen member 6 with a relatively high rigidity and the second screen member 7 with a relatively low rigidity expand with increase in the ambient temperature and humidity. If the expansion coefficient $\alpha$ of the first screen member 6 and the expansion coefficient $\beta$ of the second screen member 7 satisfy the relationship of $\alpha<\beta$ the second screen member 7 with a relatively low rigidity expands more. When the screen members 6 and 7 expand as desired, the screen members 6 and 7 are secured on each other by the securing component 9 in the temperature/humidity controlled vessel 8.

When the screen members 6 and 7 secured on each other are taken out of the temperature/humidity controlled vessel 8 after that, both the first screen member 6 and the second screen member 7 are subjected to contracting forces represented by arrows in FIG. 5B as they return to their stationary states at the normal ambient temperature and humidity. If a comparison is made between the two forces, the contracting force appearing in the second screen member 7 is greater because the second screen member 7 with a relatively low rigidity has a larger expansion coefficient and has expanded more. When the screen members 6 and 7 reach the normal ambient temperature and humidity, the first screen member 6 with a high rigidity always exerts a tension on the second screen member 7 in such a direction that the second screen member 7 with a relatively low rigidity is stretched out. Accordingly, the second screen member 7 with a relatively low rigidity will not be wrinkled nor cause partial or entire separation in the translucent screen. Therefore, the rear projection display apparatus with little image degradation can be provided.

Like the above-described first embodiment, the rear projection display apparatus of the fourth embodiment has an advantage that the translucent screen 2 can minimize image degradation not only in the early period after the second screen member 7 returns to the normal ambient temperature and humidity but also with subsequent environmental variations.

FIG. 5C shows forces appearing in the first screen member 6 and the second screen member 7 with subsequent slight increase in ambient temperature and humidity of the translucent screen 2 from the normal ambient temperature and humidity. With this environmental change, the second screen member 7 having a relatively low rigidity is still subjected to a contracting force while the first screen member 6 having a relatively high rigidity is subjected to little force. Therefore, even if the ambient temperature and/or humidity slightly rises from the normal ambient temperature and humidity, the second screen member 7 with a relatively low rigidity will not be wrinkled nor cause separation.

FIG. 5D shows forces appearing in the first screen member 6 and the second screen member 7 with subsequent decrease in ambient temperature and/or humidity of the translucent screen 2. With this environmental change, both the second screen member 7 having a relatively low rigidity and the first screen member 6 having a relatively high rigidity are further subjected to large contracting forces. If a comparison is made between the two forces, the contracting force appearing in the second screen member 7 is greater. Therefore, even if the ambient temperature or humidity of the environment falls below the normal ambient temperature and humidity after assembly, the second screen member 7 with a relatively low rigidity will not be wrinkled nor cause separation.

In the above description of the fourth embodiment, the rear projection display apparatus has the translucent screen 2 comprising two screen members 6 and 7. However, the same effect can be obtained by using a translucent screen comprising three or more screen members.

Fifth Embodiment

In the above-described fourth embodiment, the first screen member 6 and the second screen member 7 are exposed in the high ambient temperature and/or high ambient humidity atmosphere, and the expanded screen members 6 and 7 are secured on each other. The fifth embodiment, however, uses the second screen member 7 with a relatively lower rigidity than the first screen member 6 and an expansion coefficient β and the first screen member 6 with a relatively high rigidity and an expansion coefficient α, which is greater than β (β<α) The screen members 6 and 7 are secured to each other by the securing component 9 at a low ambient temperature and/or low ambient humidity. This embodiment has the same effect as the fourth embodiment.

FIGS. 6A to 6D are conceptual diagrams showing how the translucent screen of the fifth embodiment is assembled. As shown in FIG. 6A, the second screen member 7 with a relatively low rigidity and the first screen member 6 with a relatively high rigidity are exposed beforehand in a low ambient temperature and/or low ambient humidity provided by the temperature/humidity controlled vessel 8 for a certain period of time. Both the first screen member 6 with a relatively high rigidity and the second screen member 7 with a relatively low rigidity contract with decrease in ambient temperature and/or humidity. If the expansion coefficient α of the first screen member 6 and the expansion coefficient β of the second screen member 7 satisfy the relationship of $$\alpha > \beta$$

the first screen member 6 with a relatively high rigidity contracts more. When the screen members 6 and 7 contract as desired, the screen members 6 and 7 are secured on each other by the securing component 9 in the temperature/humidity controlled vessel 8.

When the screen members 6 and 7 secured on each other are taken out of the temperature/humidity controlled vessel 8 after that, the first screen member 6 and the second screen member 7 are subjected to expanding forces, as represented by the arrows in FIG. 5B, as they return to their stationary states at the normal ambient temperature and humidity. If a comparison is made between the two forces, the expanding force appearing in the first screen member 6 is greater because the first screen member 6 with a relatively high rigidity has a larger expansion coefficient and has contracted more. When the screen members 6 and 7 reach the normal ambient temperature and humidity, the first screen member 6 with a high rigidity always exerts a tension on the second screen member 7 in such a direction that the second screen member 7 with a relatively low rigidity is stretched out, Accordingly, the second screen member 7 with a relatively low rigidity will not be wrinkled nor cause partial or entire separation in the translucent screen. Therefore, the rear projection display apparatus with little image degradation can be provided.

Another advantage of the rear projection display apparatus of the fifth embodiment is that the translucent screen 2 can minimize image degradation not only in the early period after the second screen member 7 returns to the normal ambient temperature and humidity but also with subsequent environmental variations.

FIG. 6C shows forces appearing in the first screen member 6 and the second screen member 7 with subsequent increase in ambient temperature and/or humidity of the translucent screen from the normal ambient temperature and humidity. With this environmental change, both the second screen member 7 having a relatively low rigidity and the first screen member 6 having a relatively high rigidity are further subjected to large expanding forces. If a comparison is made between the two forces, the expanding force appearing in the first screen member 6 is greater. Therefore, even if the ambient temperature and/or humidity increases from the normal ambient temperature and humidity after assembly, the second screen member 7 with a relatively low rigidity will not be wrinkled nor cause separation.

FIG. 6D shows forces appearing in the first screen member 6 and the second screen member 7 with subsequent slight decrease in ambient temperature and/or humidity of the translucent screen 2. With this environmental change, the first screen member 6 having a relatively high rigidity is still subjected to an expanding force while the second screen member 7 having a relatively low rigidity is subjected to little force. Therefore, even if the ambient temperature and/or humidity of the environment decreases slightly from the normal ambient temperature and humidity, the second screen member 7 with a relatively low rigidity will not be wrinkled nor cause separation.

In the above description of the fifth embodiment, the rear projection display apparatus has the translucent screen 2 comprising two screen members 6 and 7. However, the same effect can be obtained by using a translucent screen 2 comprising three or more screen members.

Sixth Embodiment

The sixth embodiment shows the securing component 9 for integrally securing the first screen member 6 and the second screen member 7 in any translucent screen 2 of the above-described first to fifth embodiments.

FIGS. 7A.to 7F show enlarged views of different examples of the securing component 9, and FIG. 7G shows any translucent screen 2 of the above-described first to fifth embodiments.

In FIG. 7A, the screen members 6 and 7 are secured on each other with a certain clearance therebetween by joining the screen members 6 and 7 with double-faced tape 10 placed outside the effective picture area. Alternately, the screen members 6 and 7 may be joined by adhesive 12 instead of the double-faced tape 10.

When the screen members 6 and 7 are brought into direct contact with each other, tape 11 can be placed outside the effective picture area to cover edges of the screen members 6 and 7 from the outside, as shown in FIG. 7B. Alternately, the screen members 6 and 7 may be partially melted outside the effective picture area and welded to each other, without using the tape 11.

In FIG. 7C, the second screen member 7 to be secured is provided with a convex area 7a outside the effective picture area and the other first screen member 6 is provided with a concave area 6a that fits the convex area 7a. The screen members 6 and 7 are secured on each other by the fit of the concave and convex areas 7a and 7b. The figure shows that the screen members 6 and 7 are secured on each other by direct contact, but the screen members 6 and 7 can be secured with a desired clearance in between by forming the convex area 7 with a height exceeding the depth of the concave area 6a.

In FIG. 7D, the screen members 6 and 7 are provided with two convex areas each outside the effective picture area on the non-joining face, and the two screen members 6 and 7 are secured on each other by fitting the ends of a jig 13 having a U-shaped cross section into the two clearances between the convex areas 7b, 7c, 6b, and 6c. Instead of the convex areas 7b, 7c, 6b, and 6c, concave areas 7d and 6d may be formed as shown in FIG. 7E.

In FIG. 7F, the screen members 6 and 7 of the translucent screen 2 are provided with holes 6e and 7e in multiple aligning positions outside the effective picture area of the screen, and the screen members 6 and 7 are secured on each other by the screw 14 or the like. The screen members 6 and 7 may be secured by riveting or the like. The screen members 6 and 7 can also be secured by inserting round plastic pins with stopping head instead of metal rivets into the holes 6e and 7e from one side of the screen and melting or securing the prongs sticking on the other side of the screen by a frame member.

Securing the screen members 6 and 7 with any of the securing component 9 described above at the top and bottom, at the right side and left side, or at four sides is an effective way for preventing the second screen member 7 with a relatively low rigidity from being wrinkled or causing separation. Therefore, the translucent screen 2 with little image degradation can be provided.

In the examples described above, the first screen member 6 and the second screen member 7 composing the translucent screen 2 are a Fresnel lens sheet and a lenticular lens sheet respectively and are illustrated as sheets having the same thickness. At least the screen member with a relatively low rigidity of the two screen members, however, is formed by a film sheet, as shown in FIG. 11. In this description of the embodiment, the rear projection display apparatus has a translucent screen comprising two screen members 6 and 7. Any of the securing means described above can have the same effect even if the translucent screen 2 comprises three or more screen members.

Seventh Embodiment

In the above-described first to sixth embodiments, the first screen member 6 and the second screen member 7 secured on each other are held by a common frame member 5, as shown in FIG. 1. The frame member 5 is a frame-shaped member secured on the cabinet or integrally formed as a part of the cabinet of the rear projection display apparatus, for instance.

The rear projection display apparatus of the seventh embodiment securely holds any one of or both of the screen members 6 and 7 with separate holders. For instance, the first screen member 6 may be secured on the cabinet while the second screen-member 7 is secured on the frame member 51 mounted on the cabinet.

Figure 3B:
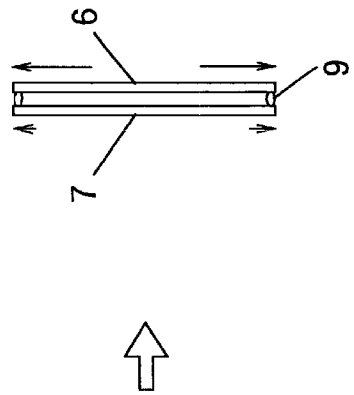
Figure 3A:
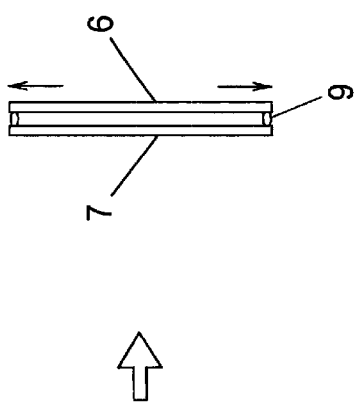

In the above-described second embodiment, the first screen member 6 is placed beforehand at the low ambient temperature and/or low ambient humidity provided by the temperature/humidity controlled vessel 8, as shown in FIG. 3A, and the second screen member 7 with a relatively low rigidity is secured on the contracted first screen member 6, as shown in FIG. 3B.

Figure 8A:
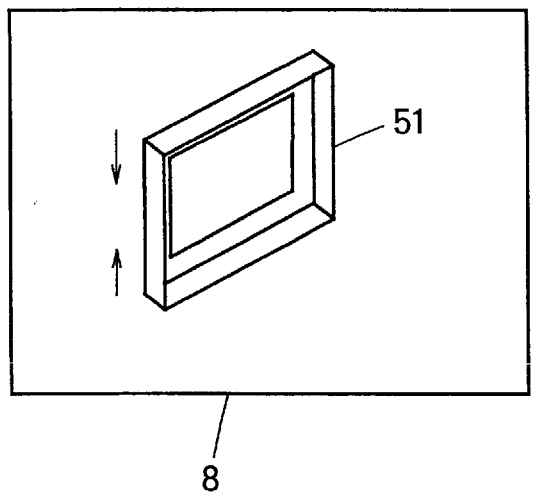
FIGS. 8A and 8B are conceptual diagrams showing how the translucent screen is assembled in a seventh embodiment of the present invention.
Figure 8B:
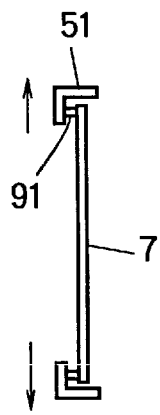

In the seventh embodiment, a frame member 51 having a relatively high rigidity is provided for the second screen member 7. The frame member 51 is placed at a low ambient temperature and/or low ambient humidity provided by the temperature/humidity controlled vessel 8 beforehand, as shown in FIG. 8A. On the other hand, the second screen member 7 with a relatively low rigidity is placed at the normal ambient temperature and humidity. Then, the frame member 51 is taken out of the vessel 8, and the second screen member 7 with a relatively low rigidity is secured on the frame at the normal ambient temperature and humidity, as shown in 8B. When the second screen member 7 with a relatively low rigidity is secured at the normal ambient temperature and humidity on the frame member 51 contracted in a low ambient temperature and/or low ambient humidity, the frame member 51 always exerts a relative tension on the second screen member 7 in such a direction that the second screen member 7 is stretched out.

Therefore, when the second screen member 7 with a relatively low rigidity is securely held by the contracted frame member 51, the screen member 7 with a relatively low rigidity will not be wrinkled nor cause separation, as in the rear projection display apparatus of the above-described second embodiment.

Figure 9A:
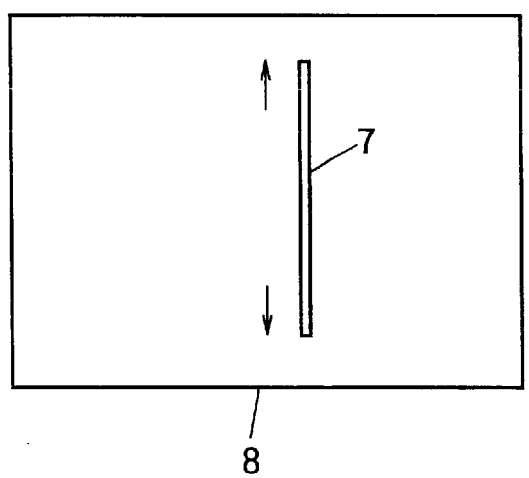
FIGS. 9A and 9B are conceptual diagrams showing how the translucent screen is assembled in another example according to a seventh embodiment of the present invention.
Figure 9B:
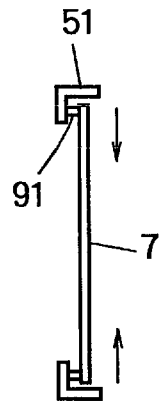

The same effect can be obtained by exposing beforehand the second screen member 7 with a relatively low rigidity in a high ambient temperature and/or high ambient humidity provided by the temperature/humidity controlled vessel 8 as shown in FIG. 9A and securing the expanded screen member 7 on the frame member 51 as shown in FIG. 9B, in the same manner as in the rear projection display apparatus of the above-described second embodiment.

In the above description of the embodiment, the rear projection display apparatus has a translucent screen comprising two screen members 6 and 7. The same effect can be obtained by using a translucent screen comprising just one screen member or of three or more screen members.

Eighth Embodiment

In the above-described fourth embodiment, the second screen member 7 with a relatively low rigidity has a higher expansion coefficient than the first screen member 6 with a relatively high rigidity, and the two screen members 6 and 7 are secured on each other at a high ambient temperature and/or high ambient humidity.

Figure 10A:
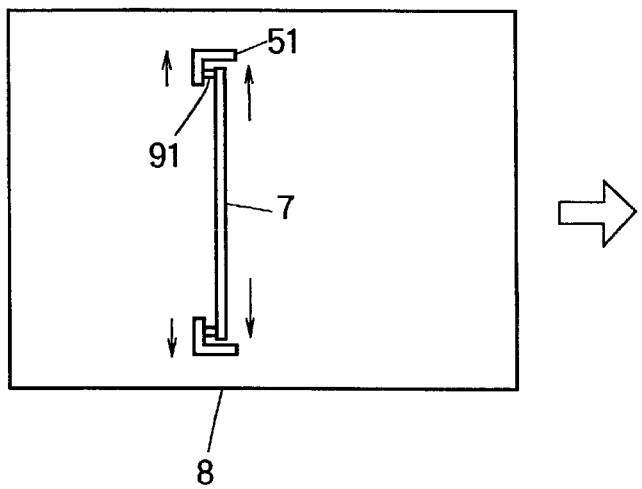
FIGS. 10A and 10B are conceptual diagrams showing how the translucent screen is assembled in an eighth embodiment of the present invention.
Figure 10B:
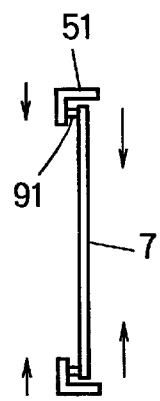

In the eighth embodiment, the second screen member 7 with a relatively low rigidity has a higher expansion coefficient than the frame member 51 functioning as a holding member, and the second screen member 7 is securely held by the frame member 51 at a high ambient temperature and/or high ambient humidity provided by the temperature/humidity controlled vessel 8, as shown in FIG. 10A. When the second screen member 7 and the frame member 51 are taken out of the vessel 8, and they reach the normal ambient temperature and humidity, the screen frame 51 with a high rigidity always exerts a tension on the second screen member 7 in such a direction that the second screen member 7 with a relatively low rigidity is stretched out, as shown in FIG. 10B. Accordingly, the second screen member 7 with a relatively low rigidity will not be wrinkled nor cause partial or entire separation in the translucent screen. Therefore, the rear projection display apparatus with little image degradation can be provided.

In the description of the embodiment, the rear projection display apparatus has a translucent screen 2 comprising one screen 7. However, the same effect can be obtained by using a translucent screen comprising two or more screen members.

Ninth Embodiment

In the above-described fifth embodiment, the second screen member 7 with a relatively low rigidity has a lower expansion coefficient than the first screen member 6 with a relatively high rigidity, and the two screen members 6 and 7 are secured on each other at a low ambient temperature and/or low ambient humidity.

Figure 11A:
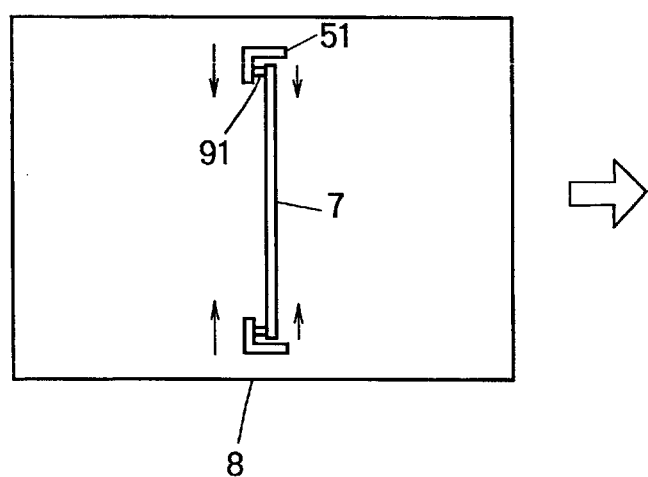
FIGS. 11A and 11B are conceptual diagrams showing how the translucent screen is assembled in a ninth embodiment of the present invention.
Figure 11B:
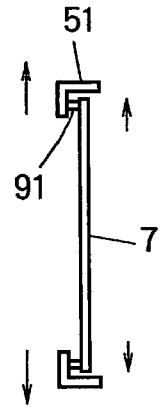

In the ninth embodiment, the second screen member 7 with a relatively low rigidity has a lower expansion coefficient than the frame member 51 functioning as a holding member, and the second screen member 7 is securely held by the frame member 51 at a low ambient temperature and/or low ambient humidity provided by the temperature/humidity controlled vessel 8, as shown in FIG. 11A. When the second screen member 7 and the frame member 51 are taken out of the vessel 8, and they reach the normal ambient temperature and humidity, the screen frame 51 with a high rigidity always exerts a tension on the second screen member 7 in such a direction that the second screen member 7 with a relatively low rigidity is stretched out, as shown in FIG. 11B. Accordingly, the second screen member 7 with a relatively low rigidity will not be wrinkled nor cause partial or entire separation in the translucent screen. Therefore, the rear projection display apparatus with little image degradation can be provided.

In the description of the embodiment, the rear projection display apparatus has a translucent screen 2 comprising one screen 7. However, the same effect can be obtained by using a translucent screen comprising two or more screen members.

Tenth Embodiment

The tenth embodiment shows the securing component 91 for securely holding the second screen member 7 on the frame member 51 in the rear projection display apparatuses of the seventh, eighth, and ninth embodiments.

FIGS. 12A to 12F show enlarged views of different examples of the securing component 91, and FIG. 12G shows a translucent screen held by the frame member.

In FIG. 12A, the areas outside the effective picture area of the second screen member 7 are pressed against the corresponding four inner sides of the frame member 51 and joined by the double-faced tape 20. The frame member 51 and the screen member 7 may be joined by adhesive 22 instead of the double-faced tape 20. The areas outside the effective picture area of the second screen member 7 that join the frame member 51 can be partially melted and welded to each other.

In FIG. 12B, the second screen member 7 is provided with a concave area (or convex area) 7f outside the effective picture area, and the frame member 51 is provided with a convex area (or concave area) 51a in an aligned position. The screen member 7 and the frame member 51 are secured by fitting those areas.

In FIG. 12C, the second screen member 7 is provided with two convex areas 7f and 7g outside the effective picture area on the face on which the second screen member 7 does not contact the frame member 51. The screen member 7 is secured by fitting the jig 21 having an L-shaped cross section into the clearances between the two convex areas 7f and 7g, from the side of the frame member 51. Instead of the convex areas 7f and 7g, concave area 7h may be formed as shown in FIG. 12D.

In the translucent screen shown in FIG. 12E, the second screen member 7 has holes 7i in multiple positions outside the effective picture area, and the second screen member 7 is secured on the frame member 51 by screw 23 or the like. The second screen member 7 may also be secured on the frame member 51 by riveting or the like. Round plastic pins may be formed to protrude from the side of the frame member 51 and inserted into the holes 7i on the side of the second screen member 7, and the ends of the pins may be melted or secured by the frame member.

In FIG. 12F, the second screen member 7 is provided with the hole 7i in multiple positions outside the effective picture area, and the second screen member 7 can be secured on the frame member 51 by fitting resilient jig 24 formed by a spring, leaf spring, or the like in the hole 7i.

With any of the securing component 91 described above, the second screen member 7 can be securely held by the frame member 51 at the top and bottom, at the right side and left side, or at four sides. Accordingly, wrinkles and separation caused by the second screen member 7 with a relatively low rigidity can be effectively prevented. Therefore, the translucent screen with little image degradation can be provided.

In the description above, the examples are used for the translucent screen 2 comprising one second screen member 7. The securing component 91 similar to them has the same effect when securing the translucent screen 2 comprising two or more screen members. The two screen members comprising the translucent screen may be securely held by separate holders.

Eleventh Embodiment

Figure 13A:
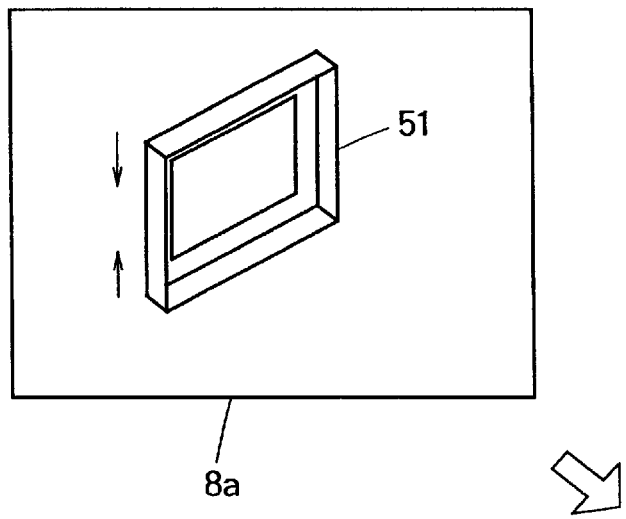
FIGS. 13A to 13C are conceptual diagrams showing how the translucent screen is assembled in an eleventh embodiment of the present invention.
Figure 13C:
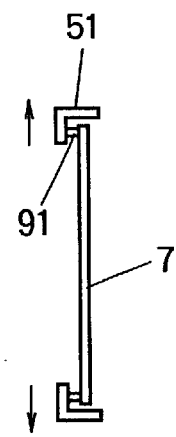
Figure 13B:
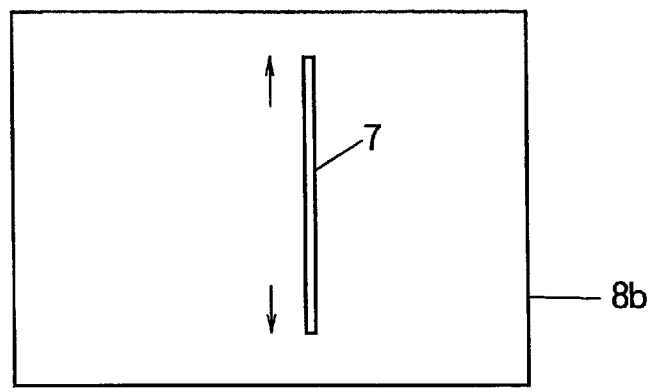
Figure 14:
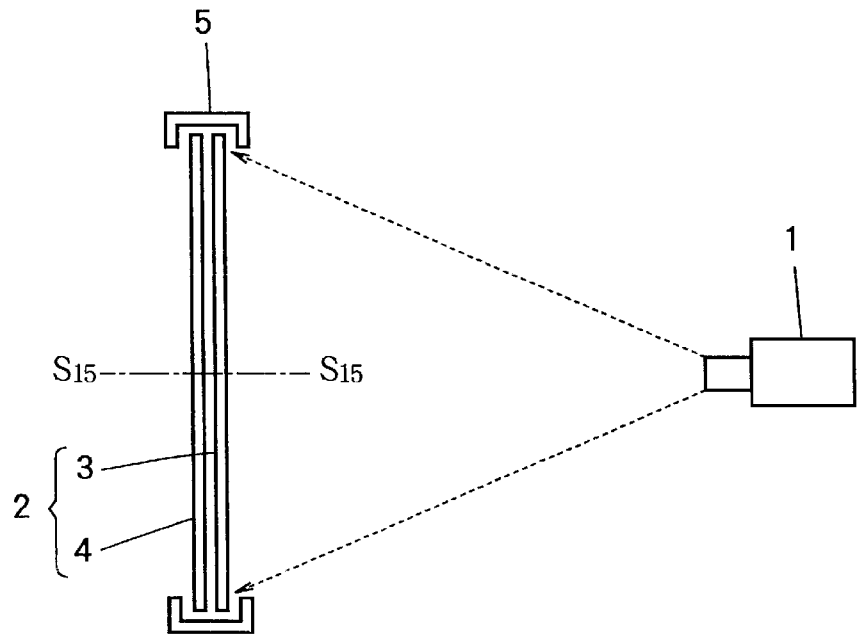
FIG. 14 is a vertical cross-sectional view showing main components of the rear projection display apparatus including the conventional translucent screen.
Figure 15:
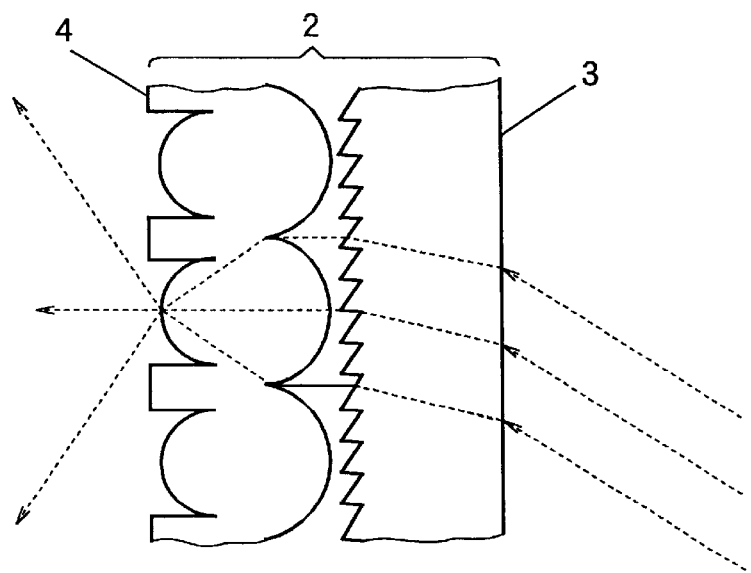
FIG. 15 is an enlarged horizontal cross-sectional view taken along a line $S_{15}$—$S_{15}$ of FIG. 14.
Figure 16:
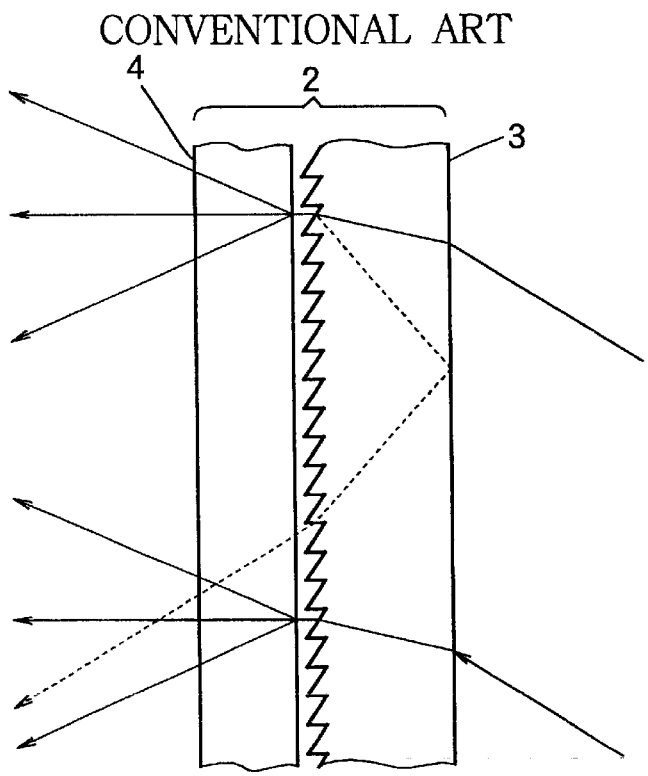
FIG. 16 is an enlarged cross-sectional view illustrating the effect of stray light when the Fresnel lens sheet is thick.
Figure 17:
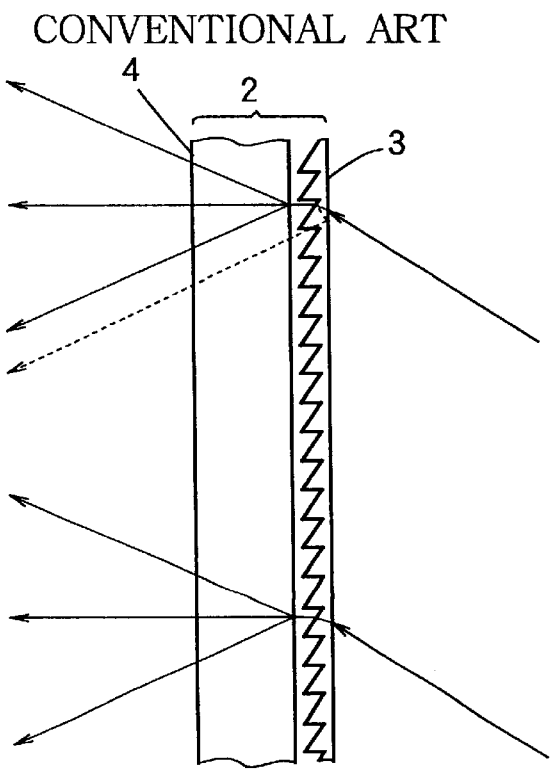
FIG. 17 is an enlarged cross-sectional view illustrating the effect of stray light when the Fresnel lens sheet 3 is thin.

In the rear projection display apparatus of the eleventh embodiment, the screen member 7 with a relatively low rigidity is exposed beforehand in a high ambient temperature and/or high ambient humidity provided by the temperature/humidity controlled vessel 8b as shown in FIG. 13B, and the frame member 51 with a relatively high rigidity is exposed in a low ambient temperature and/or low ambient humidity provided by the temperature/humidity controlled vessel 8a as shown in FIG. 13A. The expanded screen member 7 is securely held by the frame member 51 at the normal ambient temperature and humidity as shown in FIG. 13C. Accordingly, the screen member 7 with a relatively low rigidity secured on the frame member 51 will not be wrinkled nor cause separation, as in the seventh, eighth, and ninth embodiments.

In the above description of the embodiment, the translucent screen 2 comprises one screen member 7, but the same effect can be obtained with the translucent screen comprising two or more screen members, as described in the first to fifth embodiments.

Twelfth Embodiment

In the rear projection display apparatus of the twelfth embodiment, the screen member with a relatively low rigidity and the screen member with a relatively high rigidity are secured on each other beforehand in a high ambient temperature and/or high ambient humidity provided by the temperature/humidity controlled vessel as shown in FIG. 5A, and the frame member 51 that has been exposed in a low ambient temperature and/or low ambient humidity securely holds the screen members 6 and 7 at the normal ambient temperature and humidity. Accordingly, the second screen member 7 with a relatively low rigidity will not be wrinkled nor cause separation.

The translucent screen of the rear projection display apparatus can be any translucent screen comprising two screen members described in the first to fifth embodiments. The same effect can be obtained from a translucent screen comprising three or more screen members.

Thirteenth Embodiment

The thirteenth embodiment is the same as any of the first to twelfth embodiments except that at least one of the screen members composing the translucent screen 2 is a film screen. The effect of the stray light generated in the screen can be reduced while wrinkles and separation can be effectively prevented. Accordingly, the translucent screen with little image degradation can be provided.

What is claimed is:

1. A method of manufacturing a translucent screen comprising:
    altering at least one of a temperature and humidity of at least one of at least one first screen member and at least one second screen member to contract said at least one first screen member and/or expand said at least one second screen member; and
    securing edges of said at least one second screen member on said at least one first screen member so that said at least one second screen member is held under tension by said at least one first screen member at normal ambient temperature and humidity,
    wherein said at least one second screen member has a lower rigidity than that of said at least one first screen member, and
    wherein said at least one first screen member exerts a force on each of said edges of said at least one second screen member outwardly in a direction substantially parallel to said at least one second screen in such a way that said at least one second screen member is stretched at normal ambient temperature and humidity.

2. The method of manufacturing a translucent screen of claim 1,
    wherein said altering process includes expanding at least one second screen member at a high ambient temperature which is higher than the normal ambient temperature and/or a high ambient humidity which is higher than the normal ambient humidity, and
    wherein said securing process is performed at the normal ambient temperature and humidity after said altering process.

3. The method of manufacturing a translucent screen of claim 1,
    wherein said altering process includes contracting at least one first screen member at a low ambient temperature which is lower than the normal ambient temperature and/or a low ambient humidity which is lower than the normal ambient humidity, and
    wherein said securing process is performed at the normal ambient temperature and humidity after said altering process.

4. The method of manufacturing a translucent screen of claim 1,
    wherein said altering process includes
    expanding at least one second screen member at a high ambient temperature which is higher than the normal ambient temperature and/or a high ambient humidity which is higher than the normal ambient humidity, and
    contracting at least one first screen member at a low ambient temperature which is lower than the normal ambient temperature and/or a low ambient humidity which is lower than the normal ambient humidity, and
    wherein said securing process is performed at the normal ambient temperature and humidity after said altering process.

5. The method of manufacturing a translucent screen of claim 1, wherein said at least one first screen member is a Fresnel lens sheet, and said at least one second screen member is a lenticular lens sheet.

6. A translucent screen manufactured according to the method of claim 1.

7. A method of manufacturing a translucent screen comprising:
    expanding both at least one first screen member and at least one second screen member at a high ambient temperature which is higher than normal ambient temperature and/or a high ambient humidity which is higher than normal ambient humidity, said at least one first screen member having a smaller expansion coefficient than that of said at least one second screen member; and
    securing edges of said at least one second screen member on said at least one first screen member at the high ambient temperature and/or at the high ambient humidity so that said at least one second screen member is held under tension by said at least one first screen member at the normal ambient temperature and humidity,
    wherein said at least one second screen member has a lower rigidity than that of said at least one first screen member, and
    wherein said at least one first screen member exerts a force on each of said edges of said at least one second screen member outwardly in a direction substantially parallel to said at least one second screen member in such a way that said at least one second screen member is stretched at normal ambient temperature and humidity.

8. A method of manufacturing a translucent screen comprising:
    contracting both of at least one first screen member and at least one second screen member at a low ambient temperature which is lower than normal ambient temperature and/or a low ambient humidity which is lower than normal ambient humidity, said at least one first screen member having a smaller expansion coefficient than that of said at least one second screen member; and
    securing edges of said at least one second screen member on said at least one first screen member at the low ambient temperature and/or at the low ambient humidity so that said at least one second screen member is held under tension by said at least one first screen member at the normal ambient temperature and humidity,
    wherein said at least one second screen member has a lower rigidity than that of said at least one first screen member, and
    wherein said at least one first screen member exerts a force on each of said edges of said at least one second screen member outwardly in a direction substantially parallel to said at least one second screen member in such a way that said at least one second screen member is stretched at normal ambient temperature and humidity.

9. A method of manufacturing a rear projection display apparatus comprising:
    expanding both of a translucent screen and a frame member at a high ambient temperature which is higher than normal ambient temperature and/or a high ambient humidity which is higher than normal ambient humidity, said frame member having a smaller expansion coefficient than that of said translucent screen; and securing edges of said translucent screen on said frame member at the high ambient temperature and/or at the high ambient humidity so that said translucent screen is held under tension by said frame member at the normal ambient temperature and humidity, wherein said translucent screen has a lower rigidity than that of said frame member, and wherein said frame member exerts a force on each of said edges of said translucent screen in a direction substantially parallel to said translucent screen in such a way that said translucent screen is stretched at normal ambient temperature and humidity.

10. The method of manufacturing a rear projection display apparatus of claim 9, wherein:

said translucent screen is manufactured by
altering at least one of a temperature and humidity of at least one of at least one first screen member and at least one second screen member to contract said at least one first screen member and/or expand said at least one second screen member; and securing edges of said at least one second screen member on said at least one first screen member so that said at least one second screen member is held under tension by said at least one first screen member at normal ambient temperature and humidity, wherein said at least one second screen member has a lower rigidity than that of said at least one first screen member, and wherein said at least one first screen member exerts a force on each of said edges of said at least one second screen member outwardly in a direction substantially parallel to said at least one second screen member in such a way that said at least one second screen member is stretched at normal ambient temperature and humidity.

11. The method of manufacturing a rear projection display apparatus of claim 10, wherein said altering process includes expanding at least one second screen member at a high ambient temperature which is higher than the normal ambient temperature and/or a high ambient humidity which is higher than the normal ambient humidity, and wherein said securing process is performed at the normal ambient temperature and humidity after said altering process.

12. The method of manufacturing a rear projection display apparatus of claim 10, wherein said altering process includes contracting at least one first screen member is contracted at a low ambient temperature which is lower than the normal ambient temperature and/or a low ambient humidity which is lower than the normal ambient humidity, and wherein said securing process is performed at the normal ambient temperature and humidity after said altering process.

13. The method of manufacturing a rear projection display apparatus of claim 10, wherein said altering process includes
expanding at least one second screen member at a high ambient temperature which is higher than the normal ambient temperature and/or a high ambient humidity which is higher than the normal ambient humidity, and contracting said at least one first screen member at a low ambient temperature which is lower than the normal ambient temperature and/or a low ambient humidity which is lower than the normal ambient humidity, and wherein said securing process is performed at the normal ambient temperature and humidity after said altering process.

14. A rear projection display apparatus manufactured according to the method of claim 9.

15. A method of manufacturing a rear projection display apparatus comprising:

contracting both of a translucent screen and a frame member at a low ambient temperature which is lower than normal ambient temperature and/or a low ambient humidity which is lower than normal ambient humidity, said frame member having a larger expansion coefficient than that of said translucent screen; and securing edges of said translucent screen on said frame member at the low ambient temperature and/or at the low ambient humidity so that said translucent screen is held under tension by said frame member at the normal ambient temperature and humidity, wherein said translucent screen has a lower rigidity than that of said frame member, and wherein said frame member exerts a force on each of said edges of said translucent screen outwardly in a direction substantially parallel to said translucent screen in such a way that said translucent screen is stretched at normal ambient temperature and humidity.

16. A method of manufacturing a translucent screen comprising:

altering at least one of a temperature and humidity of at least one of at least one first screen member and at least one second screen member to contract said at least one first screen member and/or expand said at least one second screen member, and securing edges of said at least one second screen member on said at least one first screen member so that said at least one second screen member is held under tension by said at least one first screen member at normal ambient temperature and humidity.

17. The method of manufacturing a translucent screen of claim 16, wherein said altering process includes expanding at least one second screen member at a high ambient temperature which is higher than the normal ambient temperature and/or a high ambient humidity which is higher than a normal ambient humidity, and wherein said securing process is performed at the normal ambient temperature and humidity after said altering process.

18. The method of manufacturing a translucent screen of claim 16, wherein said altering process includes contracting at least one first screen member at a low ambient temperature which is lower than the normal ambient temperature and/or a low ambient humidity which is lower than the normal ambient humidity, and wherein said securing process is performed at the normal ambient temperature and humidity after said altering process.

19. The method of manufacturing a translucent screen of claim 16, wherein said altering process includes
expanding at least one second screen member at a high ambient temperature which is higher than the normal ambient temperature and/or a high ambient humidity which is higher than the normal ambient humidity, and
contracting said at least one first screen member at a low ambient temperature which is lower than the normal ambient temperature and/or a low ambient humidity which is lower than the normal ambient humidity, and
wherein said securing process is performed at the normal ambient temperature and humidity after said altering process.

20. The method of manufacturing a translucent screen of claim 16, wherein said at least one first screen member is a Fresnel lens sheet, and said at least one second screen member is a lenticular lens sheet.

21. A translucent screen manufactured according to the method of claim 16.

22. A method of manufacturing a translucent screen comprising:
expanding both of at least one first screen member and at least one second screen member at a high ambient temperature which is higher than normal ambient temperature and/or a high ambient humidity which is higher than normal ambient humidity, said at least one first screen member having a smaller expansion coefficient than that of said at least one second screen member; and
securing edges of said at least one second screen member on said at least one first screen member at the high ambient temperature and/or at the high ambient humidity so that said at least one second screen member is held under tension by said at least one first screen member at the normal ambient temperature and humidity.

23. A method of manufacturing a translucent screen comprising:
contracting both of at least one first screen member and at least one second screen member at a low ambient temperature which is lower than normal ambient temperature and/or a low ambient humidity which is lower than normal ambient humidity, said at least one first screen member having a smaller expansion coefficient than that of said at least one second screen member; and
securing edges of said at least one second screen member on said at least one first screen member at the low ambient temperature and/or at the low ambient humidity so that said at least one second screen member is held under tension by said at least one first screen member at the normal ambient temperature and humidity.

24. A method of manufacturing a rear projection display apparatus comprising:
expanding both of a translucent screen and a frame member at a high ambient temperature which is higher than normal ambient temperature and/or a high ambient humidity which is higher than normal ambient humidity, said frame member having a small expansion coefficient than that of said translucent screen; and
securing edges of said translucent screen on said frame member at the high ambient temperature and/or at the high ambient humidity so that said translucent screen is held under tension by said frame member at the normal ambient temperature and humidity.

25. The method of manufacturing a rear projection display apparatus of claim 24, wherein:
said translucent screen is manufactured by
altering at least one of a temperature and humidity of at least one of at least one first screen member and at least one second screen member to contract said at least one first screen member and/or expand said at least one second screen member; and
securing edges of said at least one second screen member on said at least one first screen member so that said at least one second screen member is held under tension by said at least one first screen member at normal ambient temperature and humidity.

26. The method of manufacturing a rear projection display apparatus of claim 25,
wherein said altering process includes expanding at least one second screen member at a high ambient temperature which is higher than the normal ambient temperature and/or a high ambient humidity which is higher than the normal ambient humidity, and
wherein said securing process is performed at the normal ambient temperature and humidity after said altering process.

27. The method of manufacturing a rear projection display apparatus of claim 25,
wherein said altering process includes contracting at least one first screen member at a low ambient temperature which is lower than the normal ambient temperature and/or a low ambient humidity which is lower than the normal ambient humidity, and
wherein said securing process is performed at the normal ambient temperature and humidity after said altering process.

28. The method of manufacturing a rear projection display apparatus of claim 25,
wherein said altering process includes
expanding at least one second screen member at a high ambient temperature which is higher than the normal ambient temperature and/or a high ambient humidity which is higher than the normal ambient humidity, and
contracting said at least one first screen member at a low ambient temperature which is lower than the normal ambient temperature and/or a low ambient humidity which is lower than the normal ambient humidity, and
wherein said securing process is performed at the normal ambient temperature and humidity after said altering process.

29. A rear projection display apparatus manufactured according to the method of claim 24.

30. A method of manufacturing a rear projection display apparatus comprising:
contracting both of a translucent screen and a frame member at a low ambient temperature which is lower than normal ambient temperature and/or a low ambient humidity which is lower than normal ambient humidity, said frame member having a larger expansion coefficient than that of said translucent screen; and
securing edges of said translucent screen on said frame member at the low ambient temperature and/or at the low ambient humidity so that said translucent screen is held under tension by said frame member at the normal ambient temperature and humidity.

* * * * *